(12) United States Patent
Jeng et al.

(10) Patent No.: US 9,828,908 B2
(45) Date of Patent: Nov. 28, 2017

(54) DEVICE FOR INTERNAL COOLING AND PRESSURIZATION OF ROTARY ENGINE

(71) Applicant: NATIONAL CHUNG-SHAN INSTITUTE OF SCIENCE AND TECHNOLOGY, Taoyuan (TW)

(72) Inventors: Dun-Zen Jeng, Taoyuan (TW); Ming-Chun Hsieh, Taoyuan (TW); Chih-Chuan Lee, Taoyuan (TW); Hon-Wei Hsiao, Taoyuan (TW)

(73) Assignee: NATIONAL CHUNG-SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 0 days.

(21) Appl. No.: 15/415,527

(22) Filed: Jan. 25, 2017

(65) Prior Publication Data

US 2017/0130647 A1     May 11, 2017

Related U.S. Application Data

(63) Continuation-in-part of application No. 14/213,648, filed on Mar. 14, 2014, now abandoned.

(51) Int. Cl.
| | |
|---|---|
| *F02B 55/12* | (2006.01) |
| *F01C 21/18* | (2006.01) |
| *F02B 55/10* | (2006.01) |
| *F01C 11/00* | (2006.01) |
| *F01C 21/06* | (2006.01) |
| *F02B 53/06* | (2006.01) |
| *F02B 53/08* | (2006.01) |
| *F01P 1/04* | (2006.01) |
| *F02B 33/32* | (2006.01) |

(52) U.S. Cl.
CPC ............ *F02B 55/12* (2013.01); *F01C 11/008* (2013.01); *F01C 21/06* (2013.01); *F01C 21/183* (2013.01); *F01P 1/04* (2013.01); *F02B 33/32* (2013.01); *F02B 53/06* (2013.01); *F02B 53/08* (2013.01); *F02B 55/10* (2013.01); *Y02T 10/17* (2013.01)

(58) Field of Classification Search
CPC .......... F02B 53/08; F02B 53/06; F02B 55/12; F02B 55/10; F01P 1/04; F01C 21/183; F01C 11/008; F01C 21/06
See application file for complete search history.

(56) References Cited

U.S. PATENT DOCUMENTS

| | | |
|---|---|---|
| 2,384,381 A | 9/1945 | Jocelyn |
| 8,141,360 B1 | 3/2012 | Huber |

*Primary Examiner* — Mary A Davis
(74) *Attorney, Agent, or Firm* — Chun-Ming Shih

(57) ABSTRACT

A device for internal cooling and pressurization of rotary engine, comprising: a mechanical charger, a charger outlet tube, a core cooling intake tube, an engine air intake tube, a first valve, a second valve, and a third valve. The mechanical charger is mounted in a ventilated place. The charger outlet tube is used to dispense air, and the charger outlet tube has two sides, with one side coupled to the mechanical charger. The core cooling intake tube is connected to another side of the charger outlet tube, and is used to dispense air. The engine air intake tube is connected to another side of the charger outlet tube. The device for cooling and pressurization of rotary engine is capable of achieving improved cooling and performance of rotary engine, through switching a plurality of valves, in automatic control manner and/or in remote control manner.

7 Claims, 6 Drawing Sheets

DEVICE FOR INTERNAL COOLING AND PRESSURIZATION OF ROTARY ENGINE

BACKGROUND OF THE INVENTION

Field of the Invention

The present invention relates to a device for internal cooling and pressurization, and more particularly, to a device for internal cooling and pressurization of a rotary engine, which allows a rotary engine to realize dual functions of internal cooling and pressurization, in achieving optimum performance.

Description of the Related Art

In general, due to its high horse power/volume ratio, Rotary Engine has wide applications in the Industries, since it is capable of generating greater horse power at less volume. Yet, it may also produce greater heat at less volume. Therefore, the heat dissipation problem is crucial in its performance. In case the heat generated can not be dissipated properly, that could adversely affect the performance and efficiency of the rotary engine. In order to sufficiently cool a rotary engine during operation, both the external and internal cooling are required, and that can be achieved through using air cooling, oil cooling, or water cooling. Yet, presently, in this respect, the existing technologies all have their deficiencies and shortcomings, as explained as follows.

The performance of the rotary engine is basically determined by its geometry including the air intake/exhaust time sequence arrangement (port site), the ignition timing, the cylinder volume, the air fuel ratio, and the like. Because the rotary engine contains three chambers (the cylinder) and has the property of the small size, the heat dissipation is always an urgent problem in the development. In the past years, the development of the heat dissipation mainly adopts the air cooling on the external. However, as the power required increased, the heat dissipation requirement is also rising, and the existing problems and shortages of the air cooling apparently appear. Thereby, manners of the water cooling and the oil cooling are developed for solving these problems and shortages. Nevertheless, most devices with functions of water cooling or oil cooling still focus on the external cooling. As opposed to the reciprocation engine, the internal of rotary engine also needs a better heat dissipation to reduce the abrasion on the crank shaft by high-temperature deformation and worsen the efficiency. Water or oil cooling, effective on the external cooling, is rarely adopted in the internal of a rotary engine for its sophisticated air passage pulsating flow, and thus air cooling is still widely used.

The rotor core cooling development mainly adopts ram pressure by the carrier velocity with an intake duct to guide the air flow into the core path for the heat dissipation. The mentioned manner is adopted in the rotor core cooling in dealing with high heat load at high rotational speed when outputting higher power. Therefore, it is the main purpose to increase the amount of cooling air at high RPM. As aforementioned, the complicated pulsating (discontinuous) air flow and high passage blockage make the cooling flow less. Though, at high rotational speed, increased ram pressure is required to raise the cooling flow, at low RPM, the cooling flow is little. The cooling lubricant oil in bearings works on heat dissipation of rotor crank shaft, and that is insufficient. As heat dissipation is concerned, redesign oil/lubrication system is time and cost consuming with its complexity.

With regard to the existing technology for air cooling of engines, U.S. Pat. No. 8,141,360 discloses a "Hybrid Gas Turbine and Internal Combustion Engine". In which, ambient air is first drawn by suction through the inlet filter 10, and then compressed in the gas turbine compressor 12. The compressor exhaust flow then splits into several flows. One flow through the inlet valve 42 is provided as the supercharged inlet flow to the internal combustion engine 30, which operates continuously throughout the mission (line 49 of column 4, FIG. 1), then the engine exhaust is input to a combustor 16 for combustion. The major purpose is to keep the turbine engine in low power output state, to keep it run continuously (line 5 of column 5, FIG. 1). Another exhaust flow flows from the compressor 12 to the valve 43, then it flows through an engine cooling circuit 31 into the internal combustion engine 30, with the purpose of keeping the turbine engine in low power output state, and keeping it to run continuously. The subject patent is not related to providing internal cooling for the rotary engine to raise its cooling efficiency. The internal combustion engine does not have the design and function of rotary engine internal cooling.

In addition, U.S. Pat. No. 2,384,381 discloses an "Internal Combustion Engine", in which supercharged air is delivered to either the intake manifold of the engine or to a cooling jacket surrounding the cylinder (lines 4-8, column 1, FIG. 1). While within each cylinder 10 is provided with a reciprocable piston 11 (lines 47-48, column 2, FIG. 1). As such, the subject patent relates to external cooling for a cylinder of a piston engine. The subject patent is not related to providing internal cooling for the rotary engine to raise its cooling efficiency. The piston engine does not have the design and function of rotary engine internal cooling.

Figure 5A:
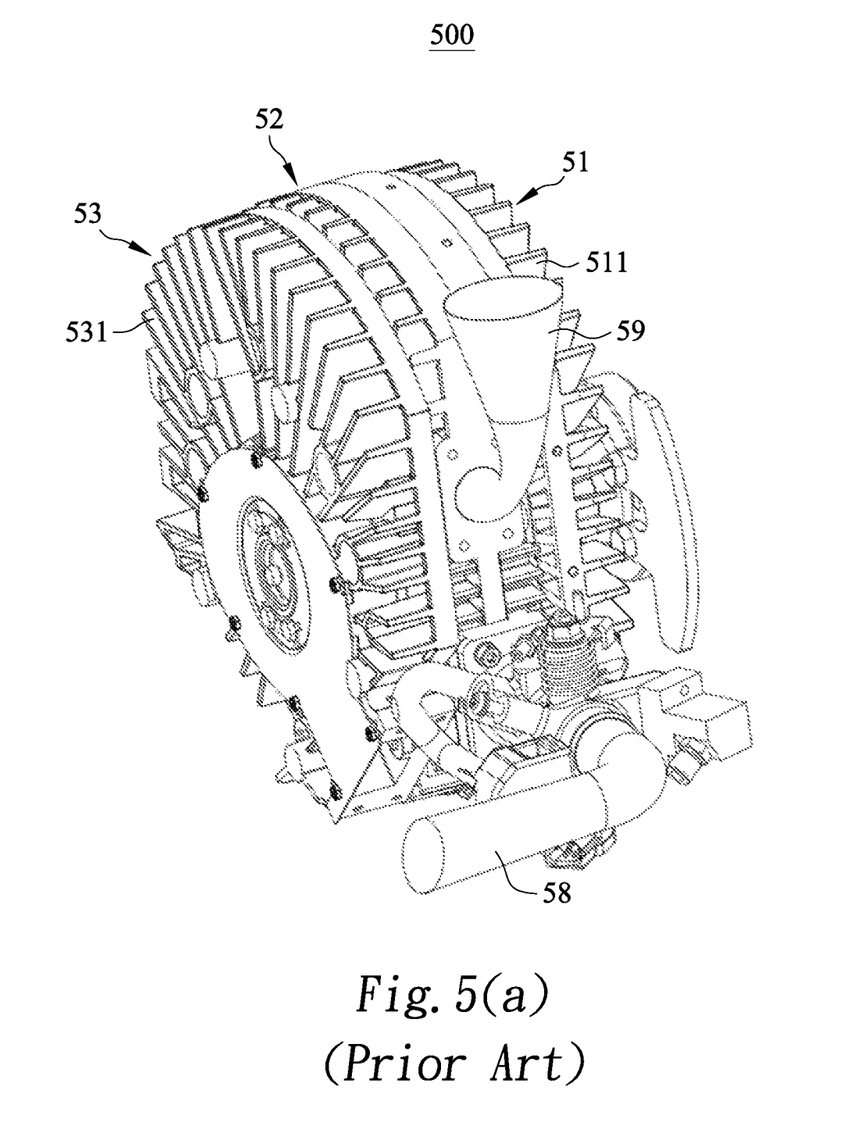
FIGS. 5(a) and 5(b) are schematic diagrams of a device for internal cooling a rotary engine according to the Prior Art.
Figure 5B:
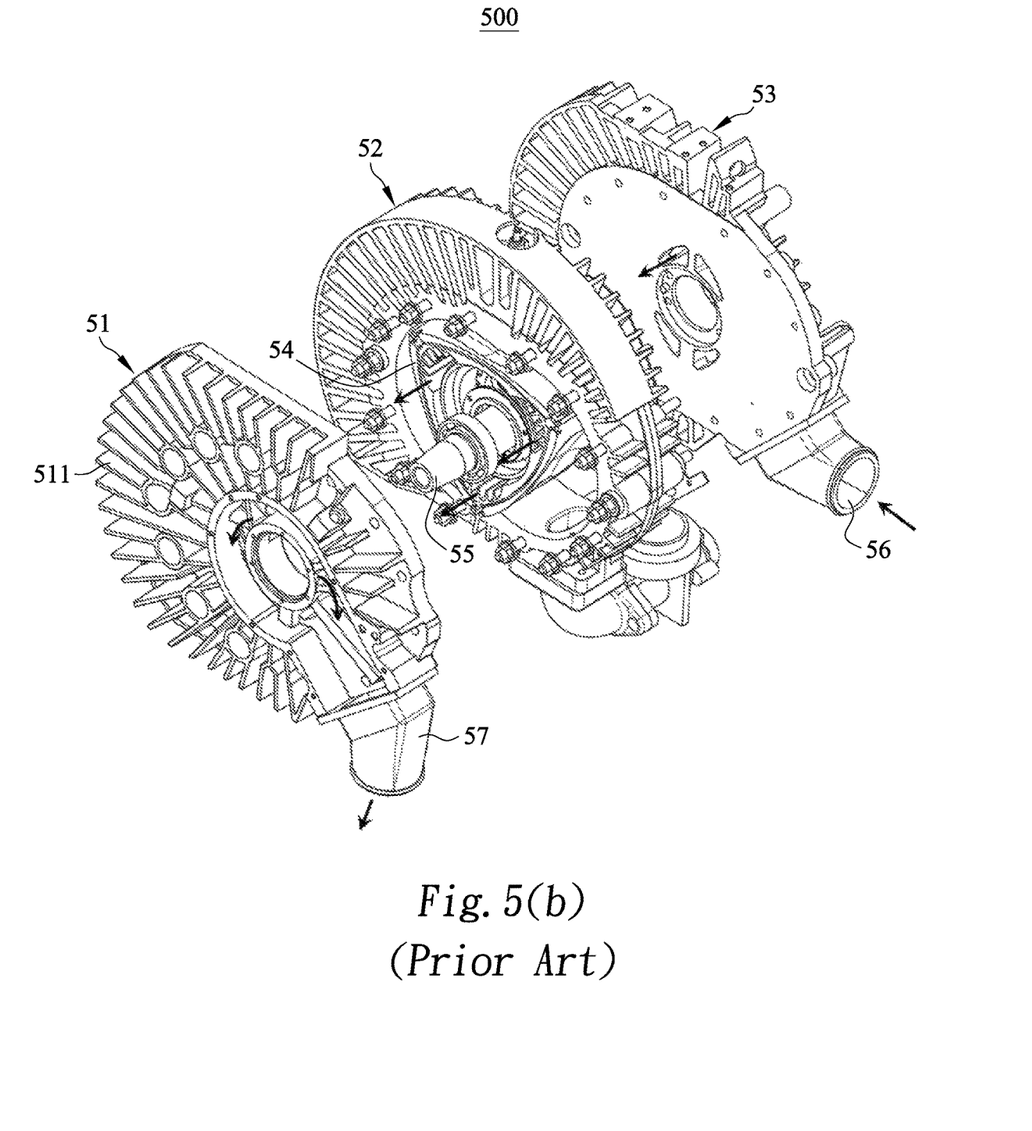

Further, refer to FIGS. 5(a) and 5(b) for a schematic diagrams of a conventional internal cooling system for a rotary engine of the Prior Art. As shown in FIGS. 5 (a) and 5(b), the rotary engine 500 includes: a front frame 51, a mid-frame 52, and a rear frame 53, a rotor 54, a crank shaft 55, a core cooling intake pipe 56, a core cooling exhaust pipe 57, an engine air intake pipe 58, an engine air exhaust pipe 59, and a plurality of cooling fins 511 and 513 provided on the circumference of the front frame 51 and the rear frame 53. In this structure, cooling fins 511 and 531 are used to achieve external cooling. For internal cooling, the rotor 54 is disposed in the mid-frame 52, and having a plurality of core cooling channels (not shown) passing through in connection with the openings in both the front and rear frames 51 and 52 for receiving clean air and exiting exhaust air respectively, in achieving internal cooling of the rotary engine.

In the structure mentioned above, for internal cooling involving rotary engine on the ground, a super charger has to be connected to one end of the core cooling intake pipe 56, through which compressed air is supplied to the rotary engine to achieve cooling. In this respect, no super charger is required to be connected to the engine air intake pipe 58, since the rotation of the rotary engine could generate a suction force strong enough to take in sufficient air, for the combustion of the rotary engine.

Therefore, the drawback of this type of rotary engine is that, when the rotary engine is used to operate in a high flying airplane, since the air is rather cool in such a high altitude, while the ram air flow of the airplane is strong enough to take in sufficient air into the core cooling intake pipe for internal cooling, as such, the super charger connected thereto is laying idle and useless, and that constitutes quite a waste. Further, when the rotary engine is in a high flying airplane, the atmospheric pressure is much reduced due to high altitude, such that the pressure of air taken into the engine air intake pipe is rather insufficient, to affect the combustion and the performance of the rotary engine.

As such, in this way, the rotary engine can not achieve efficient cooling and performance.

Therefore, presently, the design and performance of the rotary engine internal cooling and pressurization is not quite satisfactory, and it leaves much room for improvement.

SUMMARY OF THE INVENTION

In order to overcome the shortcomings and the drawbacks of the Prior Art, the present invention provides a device for internal cooling and pressurization of rotary engine, that is capable of achieving improved internal cooling and enhanced performance of the rotary engine, through switching a plurality of valves, in an automatic control and/or remote control manner.

The objective of the present invention is to provide a device for internal cooling and pressurization of rotary engine, comprising: a mechanical charger, a charger outlet tube, a core cooling intake tube, an engine air intake tube, a connection tube, a first valve, a second valve, and a third valve. The mechanical charger is mounted in a ventilated place. The charger outlet tube is used to dispense air, the charger outlet tube has two sides, with one side coupled to the mechanical charger. The core cooling intake tube is connected to another one side of the charger outlet tube, and is used to dispense air. The engine air intake tube is connected to another one side of the charger outlet tube, and is used to dispense air. The connection tube is connected between the core cooling intake tube and the engine air intake tube, and is used to dispense air. The first valve is disposed on the engine air intake tube, and is used to control the intake air quantity of the engine air intake tube, one terminal of the first valve is coupled to the charger outlet tube through the second valve, while another one terminal is coupled to the engine air intake tube. The second valve is disposed on the connection tube, and is connected between and in communication with the core cooling intake tube and the engine air intake tube, with one of the terminals of the second valve connected to the charger outlet tube. The third valve is disposed on the core cooling intake tube, and is used to control the intake air quantity of the core cooling intake tube, one terminal of the third valve is coupled to the charger outlet tube through the second valve, and another one terminal is coupled to the core cooling intake tube, while another one side of the charger outlet tube is coupled to the first valve, the second valve, and the third valve respectively. The engine air intake tube and the core cooling intake tube are coupled to a rotary engine body, to allow the device to be switched to perform cooling and pressurization. The rotary engine body in turn drives a propeller into rotation. In the present invention, "core cooling" and "internal cooling" are used interchangeably to have the same meaning.

In an aspect of the present invention, the device can be switched to a ground surface cooling mode, a high altitude pressurization mode, or a requirement adjusting mode depending on the requirements of its working environment, through utilizing the first valve, the second valve, and the third valve.

In another aspect of the present invention, the second valve includes a guide plate, that is rotatable in 360 degrees to guide the air to flow in the directions required.

The Ground Surface Cooling Mode

When the first valve is opened and the third valve is closed, and the second valve is controlled to move into a position blocking the supercharged air flow to the engine air intake pipe, the device is switched to a ground surface cooling mode, to achieve effective internal cooling of a rotary engine working in a ground surface environment. In this way, all the supercharged air flow coming from the mechanical supercharger is made to flow to the rotary engine body through the core cooling intake tube for internal cooling. At the same time, sufficient air flow is suctioned into the engine air intake tube through the rotation of the rotary engine, for supplying it to the rotary engine to sustain combustion for generating power. This configuration is most suitable for use in summer or tropical areas of very warm weather, to achieve maximum cooling, while maintaining normal air intake and combustion.

The High Altitude Pressurization Mode

When the first valve is closed and the third valve is opened, and the second valve is controlled to move into a position blocking the supercharged air flow to the core cooling intake pipe, the device is switched to the. high altitude pressurization mode, to achieve effective pressurization of air flow to a rotary engine working in a high attitude environment, such as in a high flying airplane. But the present invention is not limited to this. As such, all the supercharged air flow coming from the mechanical supercharger is made to flow to the rotary engine body through the engine air intake tube for pressurization. At the same time, sufficient air flow is taken into the core cooling intake tube from the high air atmosphere, for supplying it to the rotary engine to provide sufficient cooling. This configuration is most suitable for use in a high flying airplane, to achieve maximum pressurization, while maintaining normal internal cooling.

The Requirement Adjusting Mode

When both the first valve and the third valve are closed, while the second valve is opened, the device is switched to the requirement adjusting mode, to achieve effective internal cooling and pressurization for the air flow to the rotary engine working in a requirement adjusting environment, such that the switching of the first valve, the second valve, and the third valve depends on the actual requirement of cooling and pressurization of the rotary engine. For example, when the rotation of the rotary engine reaches a certain speed, the supercharged air flow can be used for both cooling and pressurization. In this way, the supercharged air flow coming from the mechanical supercharger is made to flow to the rotary engine body through the core cooling intake tube and the engine air intake tube, in achieving optimized internal cooling and pressurization as required.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The invention, as well as its many advantages, may be further understood by the following detailed description and drawings in which.

DETAILED DESCRIPTION OF THE INVENTION

Figure 1:
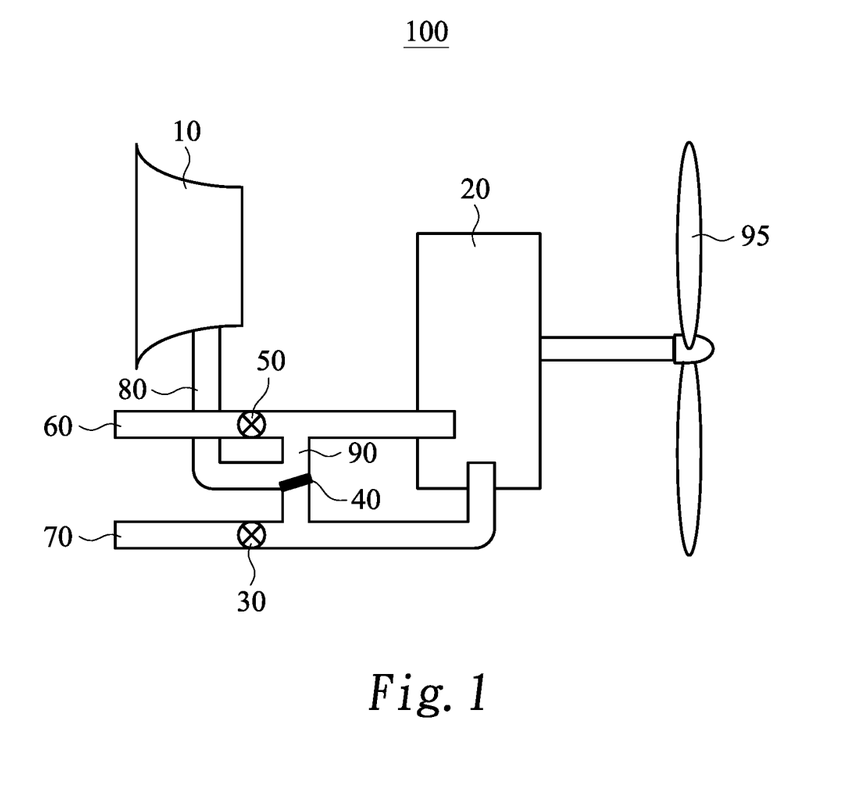
FIG. 1 is a schematic diagram of a device for an internal cooling and pressurization of a rotary engine according to an embodiment of the present invention.

Referring to FIG. 1 is a schematic diagram of a device for internal cooling and pressurization of a rotary engine according to an embodiment of the present invention. As shown in FIG. 1, the device for internal cooling and pressurization of a rotary engine 100 includes a mechanical charger 10, a charger outlet tube 80, a core cooling intake tube 60, an engine air intake tube 70, a connection tube 90, a first valve 30, a second valve 40, and a third valve 50. The mechanical charger 10 is mounted in a ventilated place. The charger outlet tube 80 is used to dispense air, the charger outlet tube 80 has two sides, with one side coupled to the mechanical charger 10. The core cooling intake tube 60 is connected to another side of the charger outlet tube 80, and is used to dispense air. The engine air intake tube 70 is connected to another one side of the charger outlet tube 80, and is used to dispense air. The connection tube 90 is connected between the core cooling intake tube 60 and the engine air intake tube 70, and is used to dispense air. The first valve 30 is disposed on the engine air intake tube 70, and is used to control the intake air quantity of the engine air intake tube 70, one terminal of the first valve 30 is coupled to the charger outlet tube 80 through the second valve 40, while another one terminal is coupled to the engine air intake tube 70. The second valve 40 is disposed on the connection tube 90, and is connected between and in communication with the core cooling intake tube 60 and the engine air intake tube 70, with one of the terminals of the second valve 40 connected to the charger outlet tube 80. The third valve 50 is disposed on the core cooling intake tube 60, and is used to control the intake air quantity of the core cooling intake tube 60, one terminal of the third valve 50 is coupled to the charger outlet tube 80 through the second valve 40, and another one terminal is coupled to the core cooling intake tube 60, while another one side of the charger outlet tube 80 is coupled to the first valve 30, the second valve 40, and the third valve 50 respectively. The engine air intake tube 70 and the core cooling intake tube 60 are coupled to a rotary engine body 20, to allow the device 100 to be switched to perform cooling and pressurization. The rotary engine body 20 in turn drives a propeller 95 into rotation.

In the present embodiment, the device 100 can be switched to a ground surface cooling mode, a high altitude pressurization mode, or a requirement adjusting mode depending on the requirements of its working environment, through utilizing the first valve 30, the second valve 40, and the third valve 50.

The Ground Surface Cooling Mode

Figure 2:
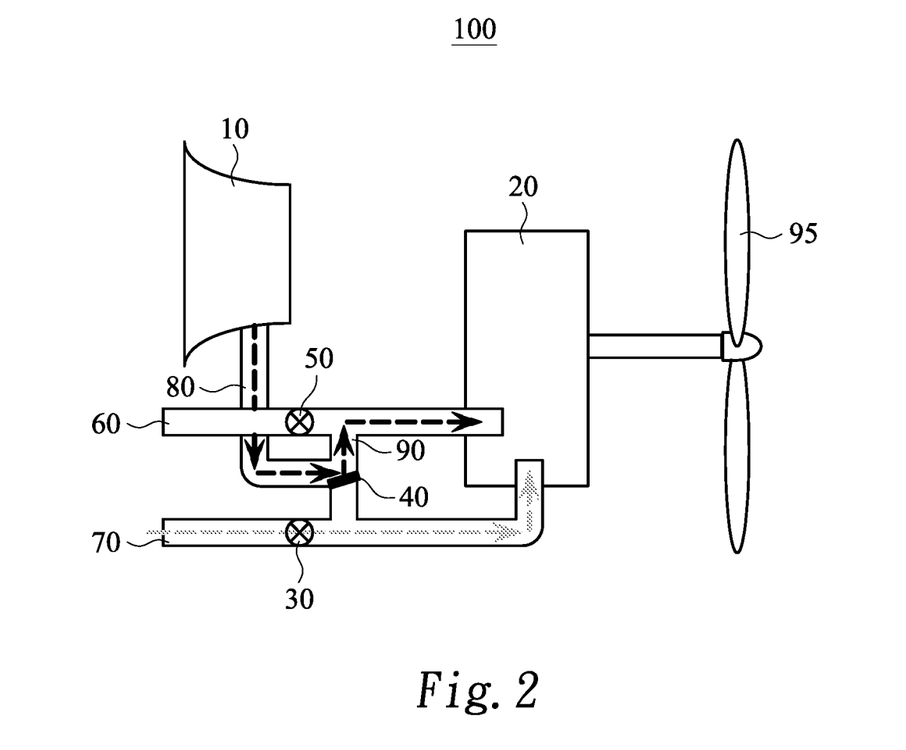
FIG. 2 is a schematic diagram of a device for an internal cooling and pressurization of a rotary engine in a ground surface cooling mode according to an embodiment of the present invention.

Refer to FIG. 2 for a schematic diagram of a device for an internal cooling and pressurization of a rotary engine in a ground surface cooling mode according to an embodiment of the present invention. As shown in FIG. 2, when the first valve 30 is opened and the third valve 50 is closed, and the second valve 40 is controlled to move in a position blocking the supercharged air flow to the engine air intake pipe 70, the device 100 is switched to a ground surface cooling mode, to achieve effective internal cooling of a rotary engine working in a ground surface environment. In this way, all the supercharged air flow coming from the mechanical supercharger 10 is made to flow to the rotary engine body 20 through the core cooling intake tube 60 for internal cooling. At the same time, sufficient air flow is suctioned into the engine air intake tube 70 through the rotation of the rotary engine 20, for supplying it to the rotary engine 20 to sustain combustion to generate power. This configuration is most suitable for use in summer or tropical areas of very warm weather to achieve maximum cooling, while maintaining normal air intake and combustion.

The High Altitude Pressurization Mode

Figure 3:
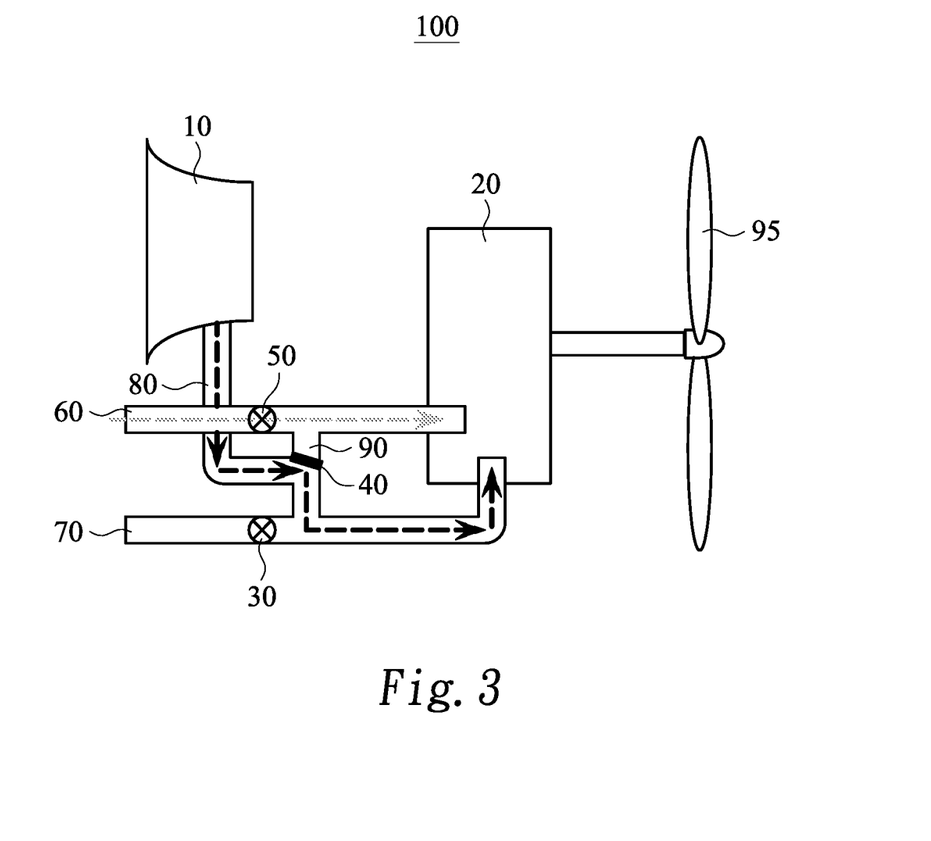
FIG. 3 is a schematic diagram of a device for an internal cooling and pressurization of a rotary engine in a high altitude pressuring mode according to an embodiment of the present invention.

Refer to FIG. 3 for a schematic diagram of a device for an internal cooling and pressurization of a rotary engine in a high altitude pressuring mode according to an embodiment of the present invention. When the first valve 30 is closed and the third valve 50 is opened, and the second valve 40 is controlled to move in a position blocking the supercharged air flow to the core cooling intake pipe 60, the device 100 is switched to the. high altitude pressurization mode, to achieve effective internal cooling of a rotary engine working in a high attitude environment, such as in a high flying airplane. But the present invention is not limited to this. As such, all the supercharged air flow coming from the mechanical supercharger 10 is made to flow to the rotary engine body 20 through the engine air intake tube 70 for pressurization. At the same time, sufficient air flow is taken into the core cooling intake tube 60 from the high air atmosphere, for supplying it to the rotary engine 20 to provide sufficient cooling. This configuration is most suitable for use in a high flying airplane, to achieve maximum pressurization for power generation, while maintaining normal internal cooling.

The Requirement Adjusting Mode

Figure 4:
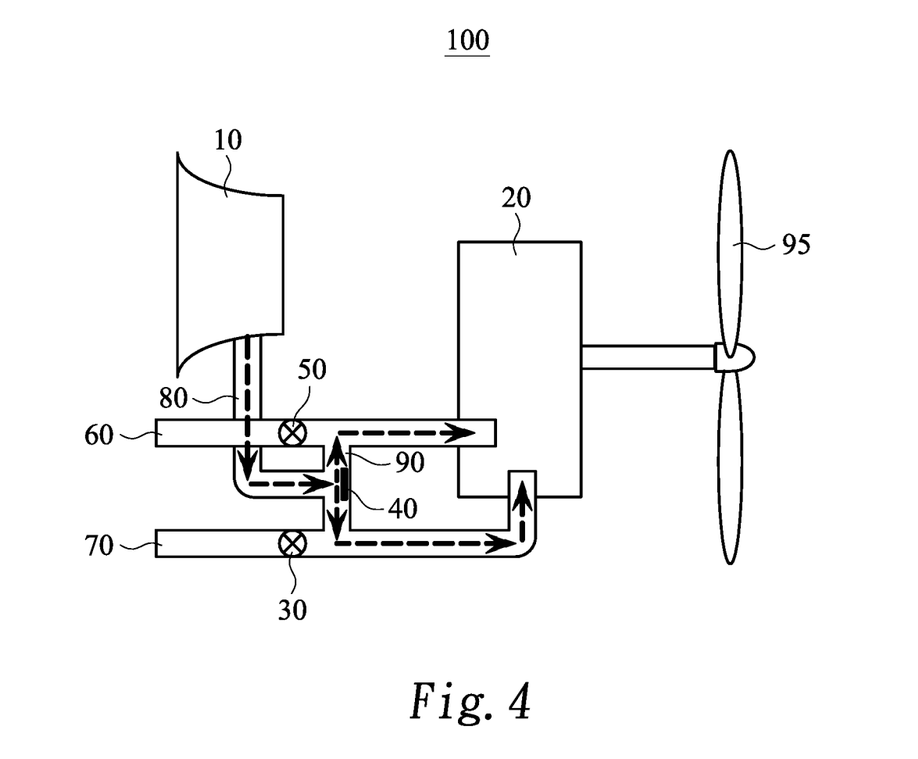
FIG. 4 is a schematic diagram of a device for an internal cooling and pressurization of a rotary engine in a requirement adjusting mode according to an embodiment of the present invention.

Refer to FIG. 4 for a schematic diagram of a device for a internal cooling and pressurization of a rotary engine in a requirement adjusting mode according to an embodiment of the present invention When both the first valve 30 and the third valve 50 are closed, while the second valve 40 is opened, the device is switched to the requirement adjusting mode, to achieve effective internal cooling of a rotary engine working in a requirement adjusting environment, such that the switching of the first valve 30, the second valve 40, and the third valve 50 depends on the actual requirement for cooling and pressurization of the rotary engine. For example, when the rotation of the rotary engine 20 reaches a certain speed, the supercharged air flow can be used for both cooling and pressurization. Therefore, the supercharged air flow coming from the mechanical supercharger 10 is made to flow to the rotary engine body 20 through the core cooling intake tube 60 and the engine air intake tube 70, in achieving optimized internal cooling and pressurization depending on actual requirement of temperature and pressure for operating the rotary engine.

The detailed descriptions above about the ground surface cooling mode, the high altitude pressurization mode, and the requirement adjusting mode are by way of example only, its purpose is to explain the design and operations of the present invention, but the present invention is not limited to this.

In the present invention, a mechanical charger, a plurality of valves, and the tubes are used to regulate the engine intake air and the core cooling air to the rotary engine, to achieve the objective of increasing engine efficiency, while providing sufficient internal cooling.

In general, in order to achieve effective cooling for a rotary engine, both external cooling (realized through heat dissipation fins) and internal cooling (to protect camshaft and bearing from being damaged by high temperature combustion) are required. In application on the ground surface, the device for an internal cooling and pressurization of a rotary engine of the present invention is required to be connected to an outside high pressure gas source, to be able to provide internal cooling and external cooling for the rotary engine, until when it works in a high flying airplane, in which, the high speed ram air flow could provide internal cooling and external cooling. However, in a highflying airplane, the atmospheric pressure is decreased along with the increase in altitude, thus causing less engine intake air supplied to the rotary engine, and the consequential decrease of rotary engine performance. The objective of the present invention is mainly to redress this problem, in which, the third valve 50 is opened while the first valve 30 is closed, such that all the supercharged air coming from the mechanical charger 10 flows through the engine air intake tube 70 to the rotary engine body 20, to raise the power generated by the rotary engine; while the core cooling air (coming from the high speed ram air flow) flowing through the core cooling intake tube 60 is supplied to the rotary engine 20 to achieve sufficient cooling.

Further, in the present invention, the switching of the first valve 30, the second valve 40, and the third valve 50 are controlled in a remote control approach or an automatic control approach, as explained as follows

The Remote Control Approach

In this approach, the first valve 30, the second valve 40, and the third valve 50 are connected to a microcontroller (MCU) (not shown), and that is in turn connected to a radio frequency (RF) receiver (not shown), to receive switching instructions from a remote controller (not shown) operated by a user. As such, when the RF receiver receives signals from the remote controller, the MCU will instruct the first valve 30, the second valve 40, and the third valve 50 to switch the device 100 into a ground surface cooling mode, a high altitude pressurization mode, or a requirement adjusting mode as required.

The Automatic Control Approach

In this approach, a temperature sensor (not shown) and a pressure sensor (not shown) are connected to the MCU to sense the temperature in the rotary engine body 20. As such, when the temperature sensor senses that the temperature in the rotary engine body 20 is above or below a certain level, or when the pressure sensor senses that the pressure in the rotary engine body 20 is above or below a certain level, a computer program stored in the MCU will instruct the first valve 30, the second valve 40, and the third valve 50 to switch the device 100 into a ground surface cooling mode, a high altitude pressurization mode, or a requirement adjusting mode as required.

In the drawings of the present invention, the elements used in the two approaches just mentioned are not shown for not obscuring the key characteristics of the present invention.

Having described the structure and operation of the present invention in detail, it is worth looking more closely into the advantages of the present invention over U.S. Pat. No. 8,141,360B1 (the Huber Case) and U.S. Pat. No. 2,384,381 (the Douglas Case) of the Prior Art.

The Advantage of the Present Invention Over the Huber Case (U.S. Pat. No. 8,141,360)

In the Huber Case (FIG. 1), an engine inlet air valve 42 controls air flow form the compressor 12 to the inlet of the ICE 30, a cooling air flow valve 43 controls air flow from the compressor 12 to the cooling circuit within the ICE 30. For the continuous operation of ICE 30, both valves 42 and 43 have to be opened, since without cooling air, the ICE 30 tends to burn out, while without engine inlet air, combustion in engine is impossible. In this configuration, since no cooling air tube and no engine air tube are provided and connected to the atmosphere outside, so it can not achieve the ground surface cooling mode, the high altitude pressurization mode, and the requirement adjusting mode of the present invention, thus not being able to realize maximum cooling, maximum pressurization, and optimized cooling and pressurization.

The Advantage of the Present Invention Over the Douglas et al. Case (U.S. Pat. No. 2,384,381)

As mentioned earlier, the Douglas et al. Case is used for delivering supercharged air either to the intake of the engine or to a cooling jacket surrounding the cylinder or both (lines 4-8, left column, page 1). As such, it is not used for internal cooling of a rotary engine. Further, the Douglas et al. Case is also used to deliver air to an engine for cooling purposes and thence delivered to the intake of the engine for combustion purpose (lines 16-18, left column, page 1). In the configurations mentioned above, since no cooling air tube and no engine air tube are provided and connected to the atmosphere outside, so it can not achieve the ground surface cooling mode, the high altitude pressurization mode, and the requirement adjusting mode of the present invention, thus not being able to realize maximum cooling, maximum pressurization, and optimized cooling and pressurization.

Summing up the above and in conclusion, compared with the Prior Art, the device for internal cooling and pressurization of rotary engine of the present invention has the advantages in that: it is capable of realizing improved internal cooling and enhanced pressurization of the rotary engine in achieving optimum power output, through switching a plurality of valves, in an automatic control and/or a remote control manner.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A system for internal cooling and pressurization of a rotary engine, comprising:
   a mechanical charger, mounted in a ventilated place, and used to selectively provide pressurized air to a combustion chamber or core cooling channels inside the rotary engine depending on engine operation modes;
   a charger outlet tube, used to dispense the pressurized air, and connected to an outlet of the mechanical charger;
   a core cooling intake tube, selectively connected to either the pressurized air from the charger outlet tube or air from an external air source, and used to dispense either the pressurized air or the external air to the core cooling channels of the rotary engine;
   an engine air intake tube, selectively connected to either the pressurized air from the charger outlet tube or the air from the external air source, and is used to dispense either the pressurized air or the external air to the combustion chamber of the rotary engine;
   a connection tube, providing fluid communication between the charger outlet tube, the core cooling intake tube, and the engine air intake tube;
   a first valve, disposed within the engine air intake tube, and used to selectively control the external air to the engine air intake tube;
   a second valve, disposed within the connection tube, to selectively control the pressurized air from the charger outlet tube to the core cooling intake tube and the engine air intake tube; and
   a third valve, disposed within the core cooling intake tube, and used to control the external air into the core cooling intake tube.

2. The system for internal cooling and pressurization of the rotary engine as claimed in claim 1, wherein the engine operating modes are switchable to: a ground surface cooling mode, a high altitude pressurization mode, or a requirement adjusting mode through utilizing the first valve, the second valve, and the third valve.

3. The system for internal cooling and pressurization of the rotary engine as claimed in claim 2, wherein when the first valve is opened and the third valve is closed, the system is operating in the ground surface cooling mode.

4. The system for internal cooling and pressurization of the rotary engine as claimed in claim 2, wherein when the first valve is closed and the third valve is opened, system is operating in the high altitude pressurization mode.

5. The system for internal cooling and pressurization of the rotary engine as claimed in claim 2, wherein when the first valve and the third valve are both closed, and the second valve is opened, system is operating in the requirement adjusting mode.

6. The system for internal cooling and pressurization of the rotary engine as claimed in claim 1, wherein the first valve, the second valve, and the third valve are operated in a remote control manner.

7. The system for internal cooling and pressurization of the rotary engine as claimed in claim 1, wherein the first valve, the second valve, and the third valve are operated in an automatic control manner.

\* \* \* \* \*